United States Patent
Ballintine et al.

(10) Patent No.: US 6,246,667 B1
(45) Date of Patent: Jun. 12, 2001

(54) BACKWARDS-COMPATIBLE FAILURE RESTORATION IN BIDIRECTIONAL MULTIPLEX SECTION-SWITCHED RING TRANSMISSION SYSTEMS

(75) Inventors: James E. Ballintine, Colts Neck, NJ (US); Wilhelm Kremer, Andover, MA (US); Bruce L. Nelson, Middletown; Kamal Kumar Raychaudhuri, Red Bank, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/146,209

(22) Filed: Sep. 2, 1998

(51) Int. Cl.[7] .................................................. H04L 12/437
(52) U.S. Cl. ......................... 370/224; 370/244; 370/249; 370/405; 714/4
(58) Field of Search .................................. 370/216, 221, 370/222, 224, 223, 225, 228, 241, 244, 248, 249, 250, 401, 402, 403, 404, 405, 452, 460; 714/1, 2, 3, 4, 712, 717

(56) References Cited

U.S. PATENT DOCUMENTS

| 5,341,364 | 8/1994 | Marra et al. ........................ 370/16.1 |
| 5,442,623 | * 8/1995 | Wu ...................................... 370/224 |
| 5,636,205 | * 6/1997 | Suzuki et al. ........................ 370/224 |
| 5,712,846 | * 1/1998 | Yoshimura .......................... 371/226 |
| 5,721,727 | * 2/1998 | Ashi et al. ........................... 370/244 |
| 5,901,137 | * 5/1999 | Nakabayashi ....................... 370/222 |

* cited by examiner

Primary Examiner—Alpus H. Hsu
(74) Attorney, Agent, or Firm—John A. Caccuro

(57) ABSTRACT

A restoration procedure for use in bidirectional multiplex section-switched ring transmission systems re-establishes a connection path by using a loopback connection at nodes bordering the failure and by then establishing a jumpered connection path, for each active tributary affected by the failure. The jumpered connection path at affected node eliminates any unnecessary loop formed in the re-established connection path caused by the loopback connection at the border nodes. There is stored in memory at each node (1) the provisioned connection path, (2) the jumpered path, and (3) a jumper flag is set indicating that a jumper connection exists. When the failure is cleared the (1) jumpered path is removed and its record erase from memory, (2) the provisioned connection path is restored, and (3) the jumper flag is reset. Advantageously, the this operation can be programmed into existing node controllers and is compatible with existing restoration procedures.

18 Claims, 13 Drawing Sheets

FIG. 5

RING NODE MAP

| NODE ID |
|---------|
| 101 ID |
| 102 ID |
| 103 ID |
| 104 ID |

FIG. 6

| K1 | PRIORITY | DEST ID |
|----|----------|---------|

IDLE
SF-LOOP
CLEAR
LOOPBACK COMPLETE

| K2 | SOURCE ID | L/S | ACTION TAKEN |
|----|-----------|-----|--------------|

IDLE
FERF

FIG. 7

| | 701 | | | 710 NODE 104 | | |
|---|---|---|---|---|---|---|
| | 702 | 703 | 704 | | | |
| | CW AU-4# | PROVISIONED CONNECTION | JUMPER | CW AU-4# | PROVISIONED CONNECTION | JUMPER |
| 711 | X | 102 (S7) | 0 | | | |
| 721 | X | 102 (S7) | 1 | | | |

FIG. 8

| | 801 | | | 810 NODE 102 | | |
|---|---|---|---|---|---|---|
| | 802 | 803 | 804 | | | |
| | CW AU-4# | PROVISIONED CONNECTION | JUMPER | CW AU-4# | PROVISIONED CONNECTION | JUMPER |
| 811 | X | 104 (S7) | 0 | | | |
| 821 | X | 104 (S7) | 1 | | | |

FIG. 9

| | 901 | | | 910 NODE 101 | | |
|---|---|---|---|---|---|---|
| | 902 | 903 | 904 | | | |
| | CW AU-4# | PROVISIONED CONNECTION | JUMPER | CW AU-4# | PROVISIONED CONNECTION | JUMPER |
| 911 | X | T (S7) | 0 | | | |
| 921 | | | | | | |

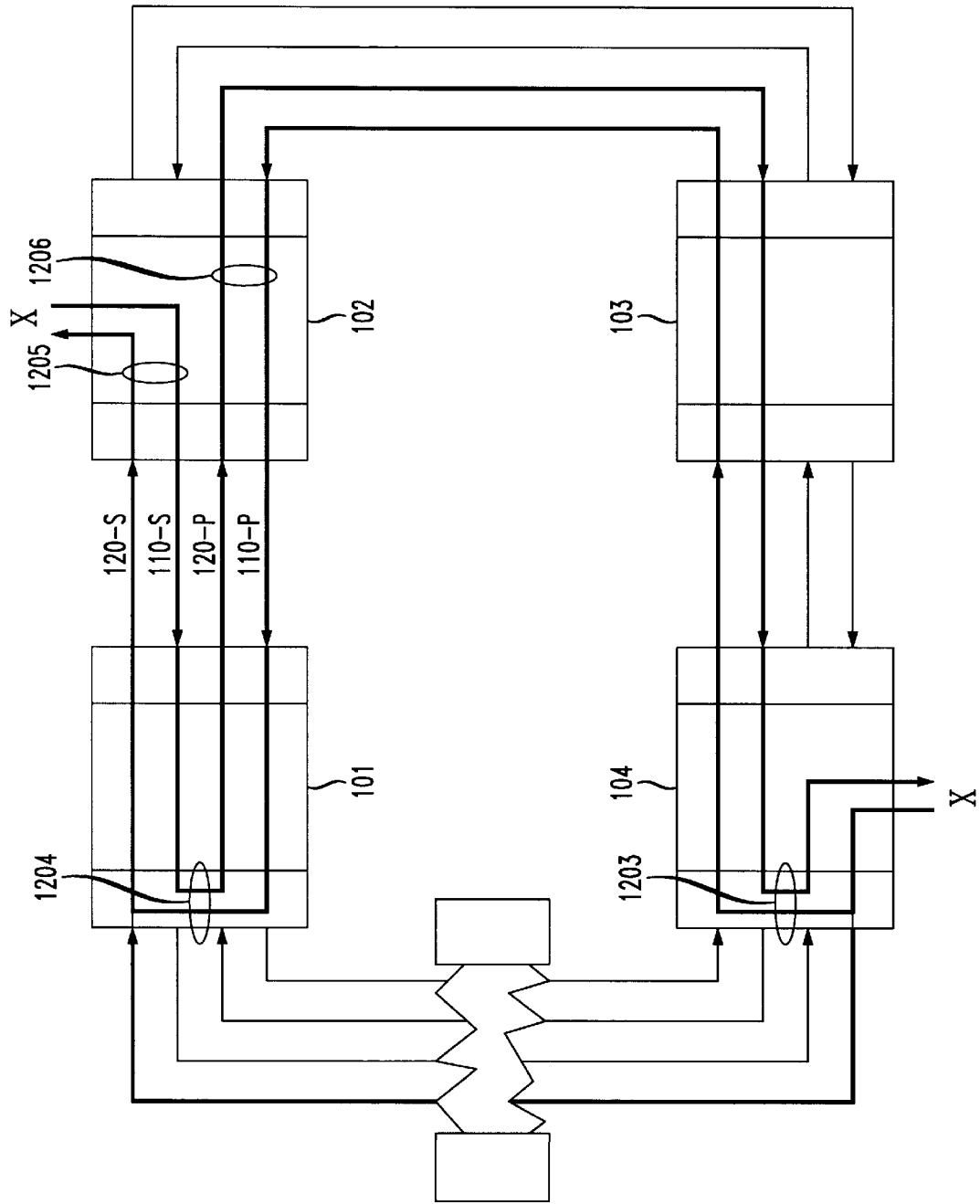

BACKWARDS-COMPATIBLE FAILURE RESTORATION IN BIDIRECTIONAL MULTIPLEX SECTION-SWITCHED RING TRANSMISSION SYSTEMS

TECHNICAL FIELD OF THE INVENTION

This invention relates to bidirectional multiplex section-switched ring transmission systems and, more particularly, to a failure restoration method and apparatus for use in such systems.

BACKGROUND OF THE INVENTION

In prior known bidirectional multiplex section switched self-healing ring transmission systems (also referred to herein as bi-directional line-switched rings (BLSRs)), bridging and switching, in the presence of a fault, was restricted to switching at the BLSR nodes which border to the fault. A problem with such an arrangement, in long distance networks, is that the restoration path can be extremely long. In certain applications, for example, transoceanic BLSR transmission systems, the length of the restoration path would be looped and may cause signals to traverse the ocean three times for particular fault conditions making the path extremely long, causing long delays and degraded system performance. The long delays and degraded service is extremely undesirable.

The notion of eliminating BLSR restoration path delay is not a new one, prior U.S. Pat. No. 5,341,364 entitled "Distributed Switching in Bi-directional Multiplex Section-Switched Ring Transmission Systems" by Marra et al., issued on Aug. 23, 1994 provided one solution to the problem. However, the method described in this patent has the disadvantage that it may not be compatible with conventional BLSR nodes, since it explicitly relies on the absence of BLSR loopbacks at the nodes bordering the failure. BLSR compatibility is important for at least two reasons: the first is mixed-vendor operation, and the second is software upgrades. What is needed is a method and apparatus which eliminates BLSR node restoration path delay yet which is compatible with existing BLSR loopback operation.

SUMMARY OF THE INVENTION

The prior restoration problems resulting from a system transmission path degradation are overcome, in accordance with the principles of the invention, by the use of a jumper flag indicating an establishment of a jumpered connection path, for each active tributary affected by the path degradation. The jumpered connection path at an affected node eliminates any unnecessary loop formed in the re-established connection path caused by the loopback connection at that node.

In accordance with the invention, there is stored in memory at each node entries identifying (1) its provisioned (or normal) service connection path and (2) a jumper flag indicating if a jumpered connection path exists.

In response to a loopback setup complete message received at a node, from both the first and second directions, it is determined if a jumpered connection is needed at that node. If a jumpered connection is not needed, conventional BLSR processing is performed. If a jumpered connection is needed, the provisioned connection is taken down, the jumpered connection is put up, a jumper flag is set, and conventional BLSR processing is performed.

In response to a loopback takedown message received at a node, from both the first and second directions, conventional BLSR processing is performed.

In response to a signal fail/degrade or a signal fail/degrade clear message received at a node, from both the first and second directions, it is determined if a jumper flag is set at that node. If the jumper flag is set, the jumpered connection is taken down, the provisioned connection is restored, and the jumper flag is reset. If the jumper flag is not set, conventional BLSR processing is performed.

Advantageously, the operation of the present invention can be programmed into existing node controllers and is compatible with existing restoration procedures.

BRIEF DESCRIPTION OF THE DRAWING

In the drawings

FIG. 5 is an exemplary ring node ID map included in memory of the controller of FIG. 2;

FIG. 6 shows the format of the switch request message (K1) and switch acknowledgment message (K2);

FIG. 7 shows communications tributary traffic pattern table for ring node 104, also included in memory of the controller of FIG. 2;

FIG. 8 shows communications tributary traffic pattern table for ring node 102, also included in memory of the controller of FIG. 2;

FIG. 9 shows communications tributary traffic pattern table for ring node 101, also included in memory of the controller of FIG. 2

FIG. 12b shows the signal "X" connection after each border node has performed a loopback connection and any protection switching, and has propagated a "loopback complete" message to other system body nodes;

DETAILED DESCRIPTION

In the following description, each item or block of each figure has a reference designation associated therewith, the first number of which refers to the figure in which that item is first located (e.g., 104 is located in FIG. 1).

Figure 1:
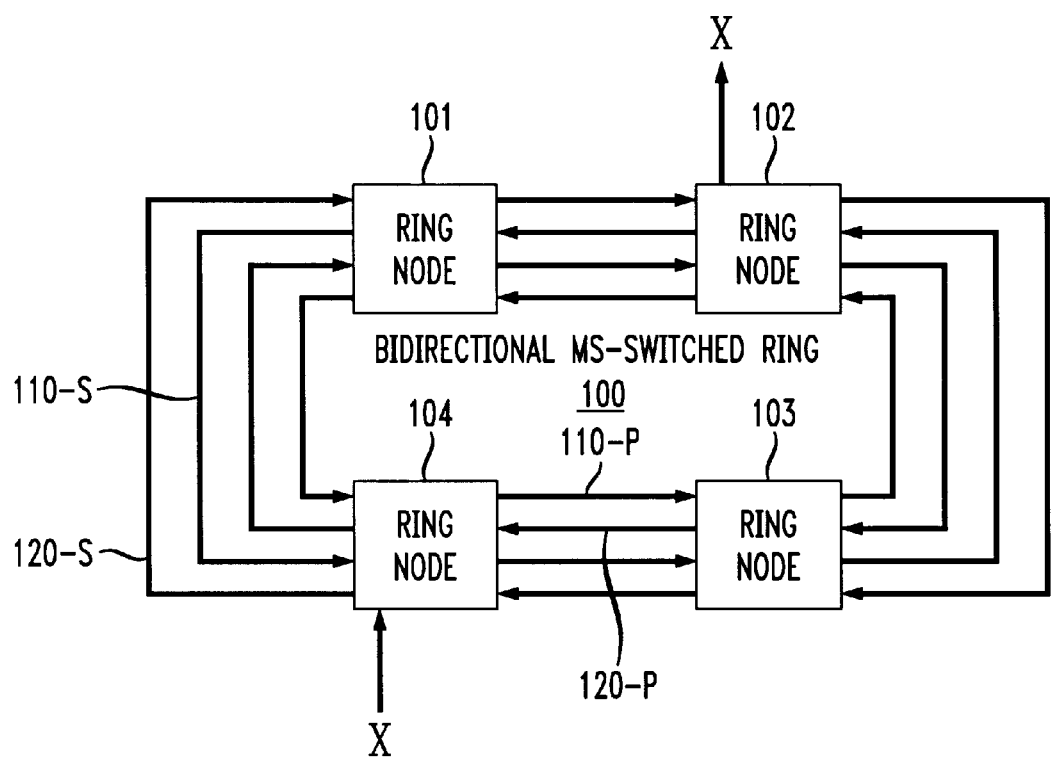
FIG. 1 shows, in simplified block diagram form, BLSR node transmission system 100 in which the present invention may be utilized, the system illustratively includes ring nodes 101 through 104.

FIG. 1 shows, in simplified form, BLSR transmission system 100, which for brevity and clarity of exposition is shown as including only ring nodes 101 through 104, each incorporating an embodiment of the invention. It will be apparent that additional or fewer ring nodes and different orientation of ring nodes may be employed, as desired. Ring nodes 101 through 104 are interconnected by transmission path 110, including service path 110-S and protection path 110-P, in a counter-clockwise direction, and by transmission path 120, including service path 120-S and protection path 120-P, in a clockwise direction. In this example, transmission paths 110 and 120 are each comprised of two (2) optical fibers. It will be apparent, however, each of transmission paths 110 and 120 could be comprised of a single optical fiber. That is, bidirectional multiplex section-switched ring transmission system 100 could be either a two (2) optical fiber or a four (4) optical fiber system. In a two (2) optical fiber system, each of the fibers in transmission paths 110 and 120 includes service bandwidth and protection bandwidth. In the four (4) optical fiber system shown, each of transmission paths 110 and 120 includes an optical fiber for service bandwidth and a separate optical fiber for protection bandwidth. Such bidirectional multiplex section-switched ring transmission systems are known. In this example, transmission of digital signals in the CCITT Synchronous Digital Hierarchy (SDH) digital signal format is assumed. However, it will be apparent that the invention is equally applicable to other digital signal formats, for example, the ANSI SONET digital signal format. In this example, it is assumed that an optical STM-N SDH digital signal format is being utilized for transmission over transmission paths 110 and 120. In one example, N=16. Details of the SDH digital signal formats are de-scribed in CCITT Recommendations G.707, G.708 and G.709 entitled "Synchronous Digital Hierarchy Bit Rates", "Network Node Interface For The Synchronous Digital Hierarchy" and "Synchronous Multiplex Structure", respectively.

It is noted that requests and acknowledgments for protection switch action are transmitted in an Automatic Protection Switch (APS) channel in the SDH multiplex section overhead accompanying the protection paths 110-P and 120-P on each of transmission paths 110 and 120. The APS channel, in the SDH format, comprises the K1 and K2 bytes (shown in FIG. 6) in the SDH overhead of each of protection paths 110-P and 120-P. For purposes of this description, a "communications circuit" is considered to be a AU-4 SDH digital signal having its entry and exit points on the ring.

Each of ring nodes 101 through 104 comprises an add-drop multiplexer (ADM). Such add-drop multiplexer arrangements are known. For generic requirements of a SDH based ADM see CCITT Recommendation G.782. In this example, the ADM operates in a transmission sense to pass, i.e., express, signals through the ring node, to add signals at the ring node, to drop signals at the ring node, and to bridge and switch signals, in accordance with the principles of the invention, during a protection switch at the ring node. Note that in the event of a loop failure, normal "loopbacks" of the affected signals in ring nodes adjacent to (i.e., border) the failure occur in a well known manner in these bidirectional multiplex section-switched ring transmission systems.

Figure 2:
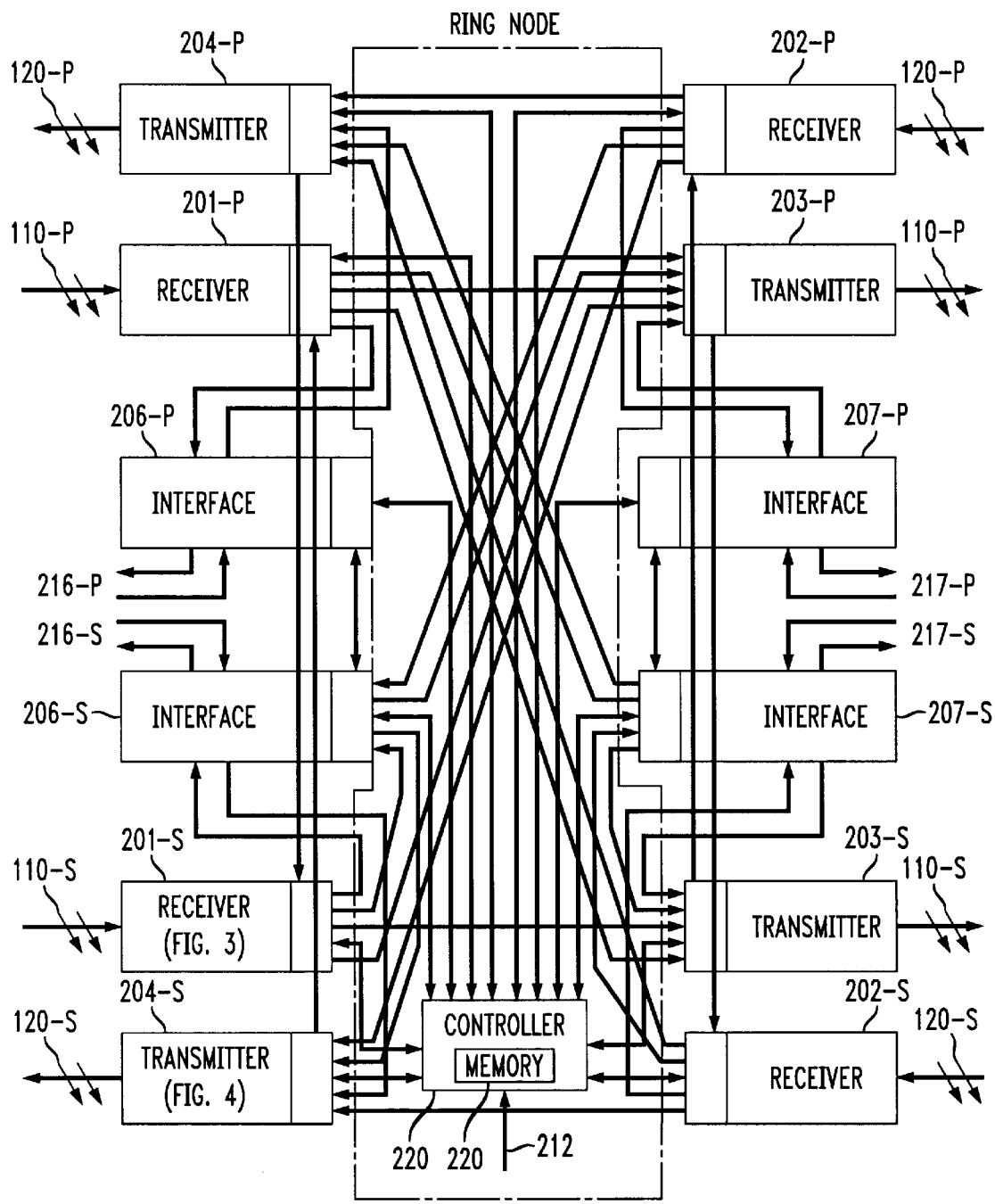
FIG. 2 shows an illustrative block diagram of a ring node including an embodiment of the invention.
Figure 3:
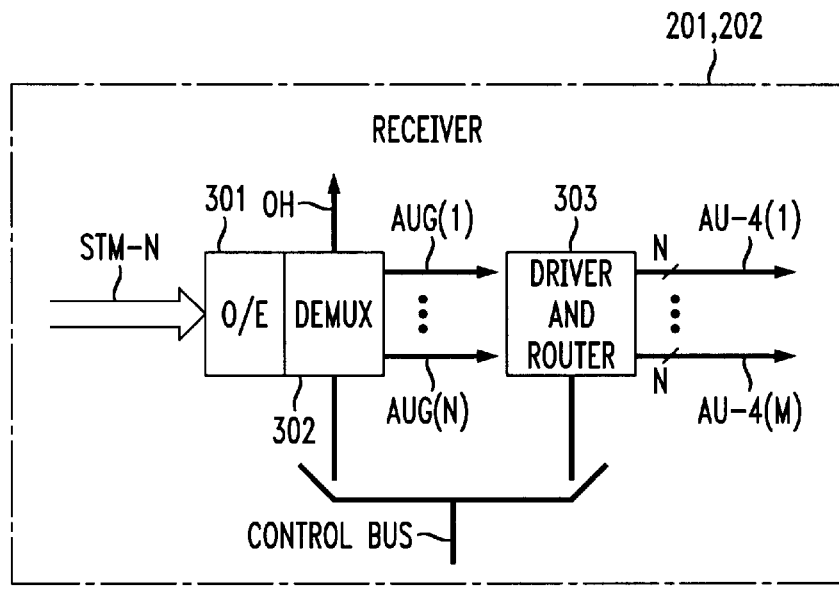
FIG. 3 shows an illustrative block diagram of a receiver used in the ring node of FIG. 2.

FIG. 2 shows, in simplified block diagram form, details of ring nodes 101 through 104. In this example, a clockwise digital signal transmission direction is assumed in the service path 110-S and the protection path 110-P on transmission path 110. It will be apparent that operation of the ring node and the ADM therein would be similar for a counter-clockwise service path 120-S and the protection path 120-P on transmission path 120. Specifically, shown are service path 110-S and protection path 110-P entering the ring node and supplying STM-N SDH optical signals to receiver 201-S and receiver 201-P, respectively, where N is, for example, 16. Similarly, shown are service path 120-S and protection path 120-P entering the ring and supplying STM-N SDH optical signals to receiver 202-S and receiver 202-P, respectively, where N is, for example, 16. Details of receivers 201 and 202 are identical, and are shown in FIG. 3, to be described below.

Figure 4:
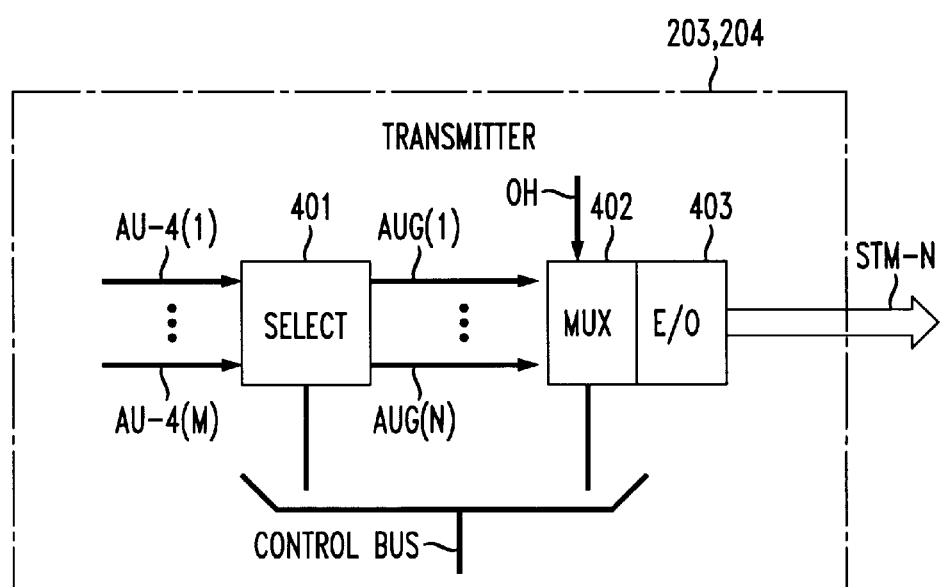
FIG. 4 shows an illustrative block diagram of a transmitter used in the ring node of FIG. 2.

The SDH STM-N optical signals exit the ring node on service path 110-S as an output from transmitter 203-S, on service path 120-S as an output from transmitter 204-S, on protection path 110-P as an output from transmitter 203-P and on protection path 120-P as an output from transmitter 204-P. Details of transmitters 203 and 204 are identical and are shown in FIG. 4, to be described below.

AU-4 SDH output signals from receiver 201-S are routed under control of controller 210 either to transmitter 203-S, i.e., expressed through to service path 110-S, to interface 206-S to be dropped, also to interface 206-S for protection switching to interface 206-P where it will be dropped or to transmitter 203-P to be supplied to protection path 110-P. In similar fashion, AU-4 SDH output signals from receiver 202-S are routed under control of controller 210 either to transmitter 204-S, i.e., expressed through to service path 120-S, to interface 207-S to be dropped, also to interface 206-S for protection switching to interface 206-P where it will be dropped or to transmitter 204-P to be supplied to protection path 120-P. (Note that this invention does allow looping back of the AU-4 SDH signals to either protection path 110-P or protection path 120-P, as per conventional BLSR operation.) The AU-4 signals from receiver 201-P are supplied either to transmitter 203-P, i.e., expressed through to protection path 110-P, to interface 206-S to be dropped or to transmitter 203-S to be supplied to service path 110-S. In similar fashion, AU-4 signals from receiver 202-P are routed under control of controller 210 either to transmitter 204-P, i.e., expressed through to protection path 120-P, to interface 207-S to be dropped or to transmitter 204-S to be supplied to service path 120-S. Note that if needed, looping back of the AU-4 SDH signals from service path 110-S to the protection path 110-P occurs using the interfaces 206-S and 206-P. Similarly, looping back of the AU-4 SDH signals from service path 120-S to the protection path 120-P occurs using the interfaces 207-S and 207-P. AU-4 SDH signals being added and dropped via interface 206-S can be bridged to transmitter 203-P and, hence, protection path 110-P and can be switched from receiver 202-P and, hence, from protection path 120-P, all under control of controller 210. Similarly, AU-4 SDH signals being added and dropped via interface 207-S can be bridged to transmitter 204-P and, hence, protection path 120-P and can be switched from receiver 201-P and, hence, from protection path 110-P, all under control of controller 210.

Interfaces 206-S, 206-P, 207-S and 207-P are employed tointerface to particular duplex links 216-S, 216-P, 217-S and 217, respectively, and could include any desired arrangement. For example, interfaces 206 and 207 could include a CEPT-4 digital signal interface to a DSX, a STM-1E (electrical) SDH digital signal interfacing to a DSX, an optical extension interface to an STM-1 SDH optical signal or the like. Such interface arrangements are known.

Figure 10:
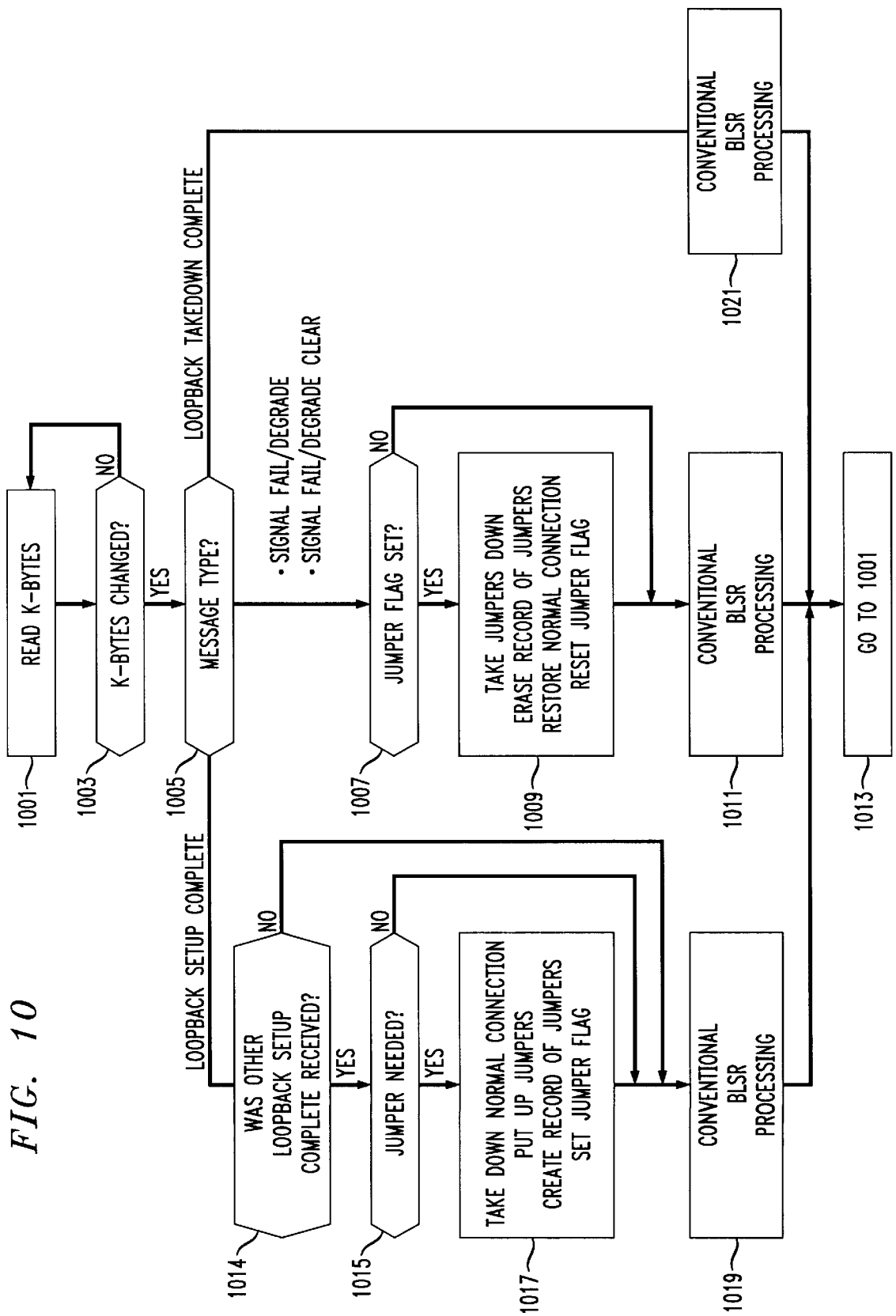
FIG. 10 is a flow chart illustrating the bridge and switch operation of the controller of FIG. 2 in response to failure, clear, loopback completion, and takedown switch messages.

In accordance with the present invention, controller 210 uses the program shown in the flow charts of FIG. 10 (which are stored in memory 220) to control the adding, dropping, and bridging of the signals via interfaces 206 and 207, as well as, the direct bridging and switching of the AU-4 tributaries being added and dropped to and from protection paths 110-P and 120-P. Controller 210 also monitors the status of interfaces 206 and 207 and the digital signals supplied thereto via the control bus arrangement. Specifically, controller 210 monitors interfaces 206 and 207 for a signal failure condition, i.e., loss-of-signal, loss-off-frame, coding violations and the like. The controller also monitors for loopback completion, takedown completion, clear, and other messages.

Controller 210 operates to effect the jumpering (signal path to protection path connection), bridging, and switching of communications tributaries at ring nodes, if necessary. Controller 210 communicates with receivers 201 and 202, transmitters 203 and 204 and interfaces 206 and 207 via a control bus arrangement. Specifically, controller 210 monitors the incoming digital signals to determine loss-of-signal, SDH format K bytes (of FIG. 6) and the like. Additionally, controller 210 causes the insertion of appropriate K byte messages (of FIG. 6) for protection switching purposes, examples of which are described below. To realize the desired bridging and switching of the communications tributaries, controller 210 is advantageously provisioned via bus 212 with the identities (IDs) of all the communications tributaries passing through the ring node, as well as, those communications tributaries being added and/or dropped at the ring node (stored in tables of FIG. 7–9), the identity of all the ring nodes in system 100 and the positions of the ring nodes in system 100 (stored in FIG. 5). The bridging and switching of communications tributaries under control of controller 210 to effect the invention is described below.

FIG. 3 shows, in simplified form, details of receivers 201 and 202 of FIG. 2. The receiver includes an optical/electrical (O/E) interface 301, demultiplexer (DEMUX) 302 and driver and router 303. An STM-N SDH optical signal is supplied to O/E 301 which converts it to an electrical STM-N signal. In turn, DEMUX 302 demultiplexes the STM-N signal, in known fashion, to obtain up to N AUG SDH signal, namely, AUG (1) through AUG (N). Again, in this example, N=16. The AUG (1) through AUG (N) signals are supplied to driver and router 303 where they are routed under control of controller 210 via the control bus as AU-4 (1) through AU-4 (M) SDH signals. As indicated above, each STM-N signal can include N AUG tributaries, in this example. The AU-4 (1) through AU-4 (M) signals are routed under control of controller 210, as described above regarding FIG. 2. DEMUX 302 also re-moves STM overhead (OH), and supplies the APS channel K bytes to controller 210 via the control bus.

FIG. 4 shows, in simplified form, details of transmitters 203 and 204 of FIG. 2. The transmitter includes select unit 401, multiplexer (MUX) 402 and electrical/optical interface (E/O) 403. The AU-4 (1) through AU-4 (M) signals are supplied to select unit 401 where the particular tributaries AUG (1) through AUG (N) are selected under control of controller 210 to be supplied to MUX 402. Again, in this example, N=16. The AUG tributaries are supplied to MUX 402 where overhead (OH) is added to yield an electrical STM-N SDH signal. In turn E/O interface 403 converts the STM-N into an optical STM-N for transmission on the corresponding fiber transmission path. MUX 402 also inserts appropriate K byte messages under control of controller 210 via the control bus.

FIG. 5 shows a ring node map table including the node identification (ID) of and relative location of each of ring nodes 101 through 104 of system 100. The ring node map table is provisioned via 212 in memory of controller 210.

With reference to FIG. 6 there is shown the format of the switch request message (K1) and switch acknowledgment message (K2). These K byte messages are both generated and monitored by controller 210. The K1 byte indicates a re-quest of a communications tributary for switch action. The first four (4) bits of the K1 byte indicate the switch request priority and the last four (4) bits indicate the ring node identification (ID) of the destination ring node. The K2 byte indicates an acknowledgment of the requested protection switch action. The first four (4) bits of the K2 byte indicate the ring node ID of the source ring node and the last 4 bits indicate the action taken. The first four bits of the K1 bytes are "priority" field which indicated the type of system message, e.g., idle, SF-loop, clear, loopback complete, takedown, etc. The fifth bit of K2 bytes is a long/short bit which indicates the path length. The last three bits of the K2 bytes are called "action taken" field, e.g., idle, FERF (far end remote failure), etc.

FIGS. 7–9 are illustrative node traffic tables for ring nodes 104, 101, and 102, respectively. These node traffic tables include the identification of the ring node communications traffic, i.e., the active communications tributaries, in both the clockwise (CW) direction and the counter-clockwise (CCW) direction of transmission. The active communications tributaries include those being added, dropped, bridged or expressed through the nodes 104, 101, and 102. Our illustrative tributary signal "X" connection, shown in FIG. 1, enters node 104 and is routed via node 101 and exits at node 102. The tables of FIGS. 7–9 include the IDs of active communications tributaries in the clockwise (CW) direction (shown as 701, 801, and 901, respectively) and counter-CW (CCW) direction (shown as 710, 810, and 910, respectively). These tables identify the tributaries (using AU-4#s), the "provisioned" destination paths of those tributaries, and the jumper statuses. Shown in the node 104 table of FIG. 7 is the AU-4 tributary identification, i.e., X in our example. As previously noted, the number of AU-4 tributaries can be up to 16. As shown in FIG. 1, the X tributary enters node 104 in the CW direction and exits node 101. The provisioned connection 711 is designated 102 (s7) indicating that CW service channel 7 carries the X signal to node 102. In node table 102 shown in FIG. 8, the provisioned connection 811 is designated 104 (s7) indicating that CW service channel 7 carries the X signal from node 104. In node table 101 shown in FIG. 9, the provisioned connection 911 is designated T (S7) indicating that CW service channel 7 carries the X signal in an express manner, i.e., the X signal passes through rather than entering or exiting at this node. As will be discussed in a later paragraph, the X signal path after the transmission path break is shown as 721, 821, 921 in FIGS. 7, 8, and 9, respectively.

FIG. 10 is a flow chart illustrating the operation of controller 210, in accordance with the invention, in controlling the operation of the ring nodes in order to effect the bridging and switching of tributary traffic paths in the presence of a ring impairment or removal of the impairment.

A ring impairment is defined as a failure or degradation of the signals from any cause including failure of the transmission paths or of the equipment. It should be noted that all so-called part-time service which was being transported on the protection paths 110-P and 120-P is preempted upon detection of the failure. Thus, the part-time service is taken off of the protection paths 110-P and 120-P.

At each node, the controller runs the process shown in the flowchart. The controller 210 loops between steps 1003 and 1001 perpetually checking for a change in the content of K bytes (of FIG. 6) of an incoming STM-N signal. If a change in the content of the K bytes is detected, then the process continues on to 1005; if not, it returns to 1001.

At 1005, the controller will take one of three branches depending on whether the new K-byte content indicates one of the following: (1) signal failure/degrade or clear, (2) loopback setup complete, or (3) loopback takedown complete. All other K-byte content changes are handled according to the rules laid down in the BLSR processing document (ITU-T G.841)

(1) For a signal failure/degrade or clear message, control passes to 1007, where a check is made to see if the jumper flag for that node is set indicating that a jumper already exists. If it does not, then control passes to 1011. If it does, control passes to 1009, where the jumpers are removed, the record of the jumpers is erased, the connections existing prior to the jumpers are reestablished, and the jumper flag is reset; control is then passed to 1011.

When control is received at 1011, conventional BLSR processing takes place, Such processing could take various forms depending on the nature of the failure message and the position of the node (i.e., whether it is a border node or a body node). For instance, if the node is a body node, then it will put up a (full or partial, depending on the type of message received) protection pass-through and propagate the message onward; if, on the other hand, it is a border node then it will perform loopback switching and generate a loopback setup complete message in the reverse direction. A key aspect and merit of the invention is that it is impervious to the details of this processing, since by virtue of the previous step, it has undone the jumpering and restored the node to a valid state germane to BLSR operation.

At the completion of the conventional BLSR processing, control is passed to 1013, which returns the controller to the wait loop of 1001.

(2) For a loopback setup completion message, control passes to 1015, at which point the controller checks the node traffic pattern to determine if any of the circuits need jumpering. A jumper is needed when the node is an endpoint (a node where traffic is added/dropped to/from the ring), unless the ring is segmented by multiple failures and the two end-points are not on the same segment. If the circuits do not need jumpering, then control is transferred to 1019, where conventional BLSR processing takes place. If a circuit needs jumpering, then control is transferred to 1017, where the controller removes the normal circuit connection and establishes the jumpered connection (this consists of disconnecting the dropped channel from the service line and reconnecting it to the same numbered channel on the protection channel coming in from the opposite direction.) When this is complete for all such circuits, a flag is set to indicate that this node is in a jumpered state, and a record of the jumpered connections is made; control is then transferred to 1019, where conventional BLSR processing takes place.

In this case, the conventional processing consists of putting up protection channel pass-throughs for all non-jumpered circuits, and propagating the loopback completion message unless the node happens to be a border node, in which case no further propagation is done.

At the completion of the conventional BLSR processing, control is passed to 1013, which returns the controller to the wait loop of 1001.

(3) For a loopback takedown completion message, control passes to 1021, where conventional BLSR processing takes place, which consists of propagating the loopback completion message unless the node happens to be a border node, in which case no further propagation is done.

At the completion of the conventional BLSR processing, control is passed to 1013, which returns the controller to the wait loop of 1001.

This last case is actually the same as case (1), since the step involving the jumpered circuits is a null step, for no jumpers can exist at this point. However, it has been explicitly culled out to make it symmetrical with step (2).

Figure 11:
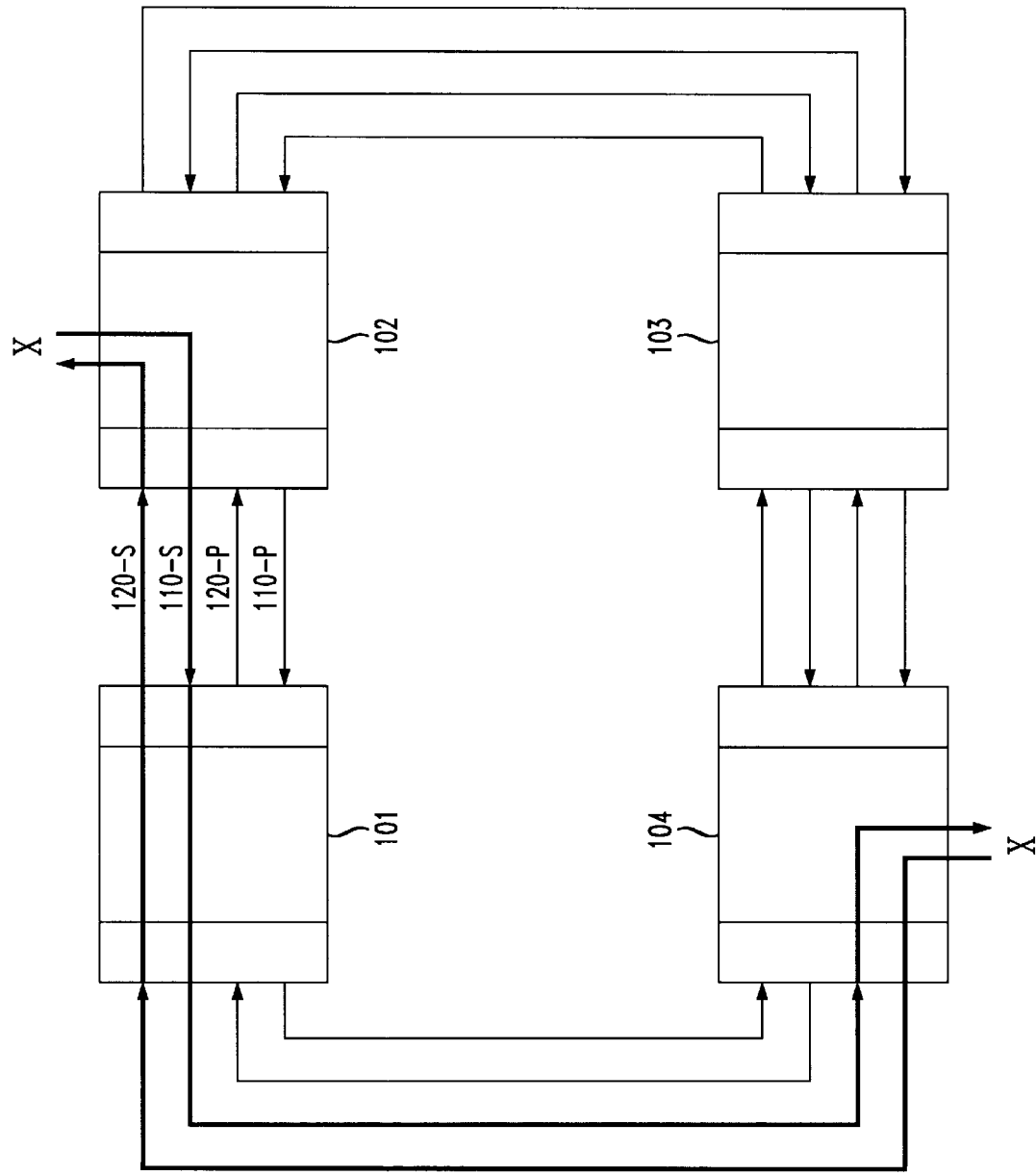
FIG. 11 shows the system after a complete fiber cut fault between ring nodes 101 and 104 and the effect on a signal "X" tributary traffic pattern after each fault bordering node has propagated a "failure" message through to other system body nodes.

FIGS. 11 through 16 provide an illustration of the operation of the present invention for a single failure occurring within a normally operating ring, and will make reference to FIGS. 7 through 10. The following description assumes that an X signal tributary connection has been established, in a well known manner, to enter node 104 and traverse node 101 and exit at node 102, as is shown in FIG. 11. The node tables for nodes 104, 102, and 101, shown in FIGS. 7–9, respectively, have stored therein the "provisioned" connection information, in a well known manner, as depicted by 711, 811, and 911.

Figure 12A:
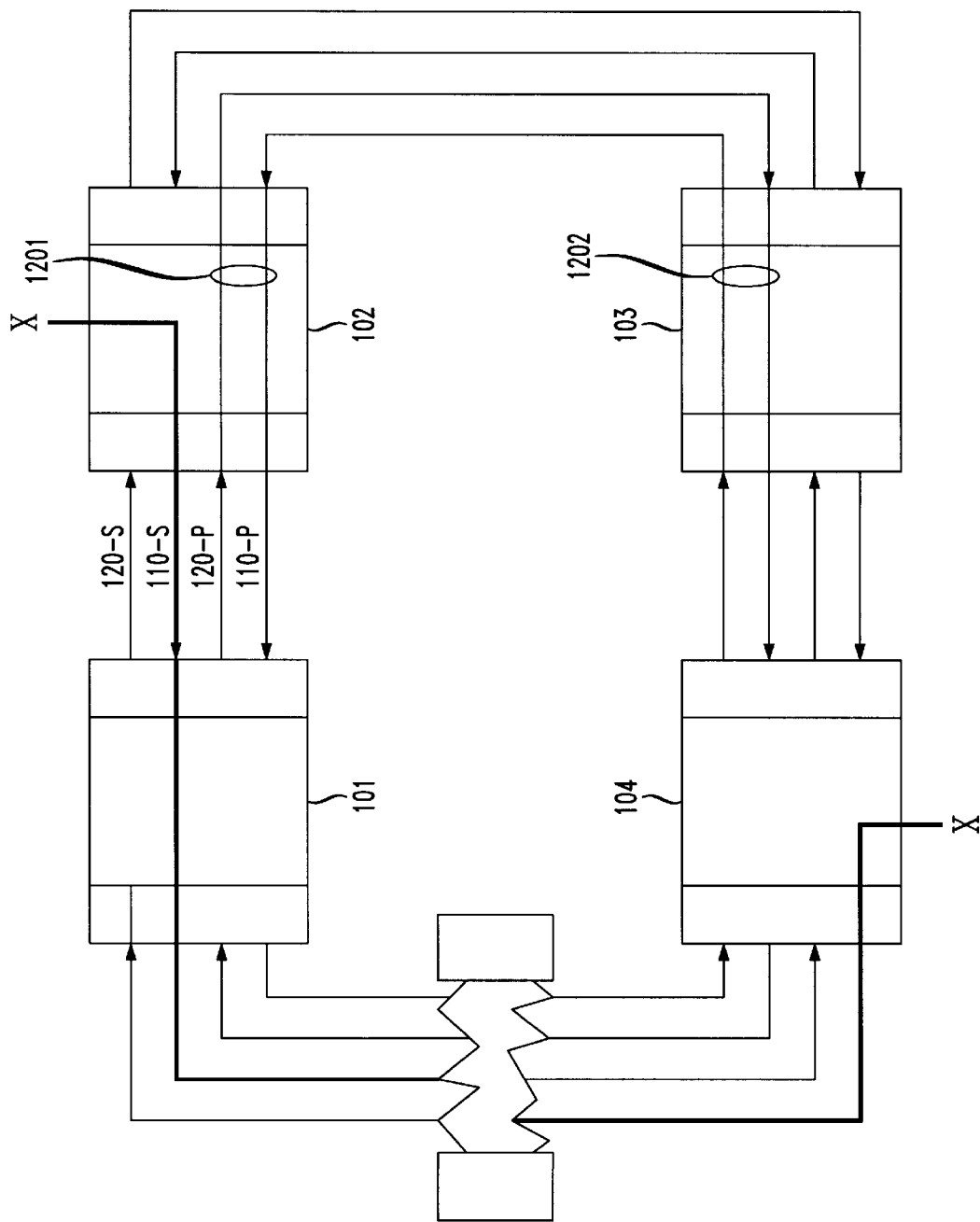
FIG. 12a shows the signal "X" connection after each border node has received the "failure" message which originated from the other border node, but has not yet performed a loopback connection and any protection switching.
Figure 13A:
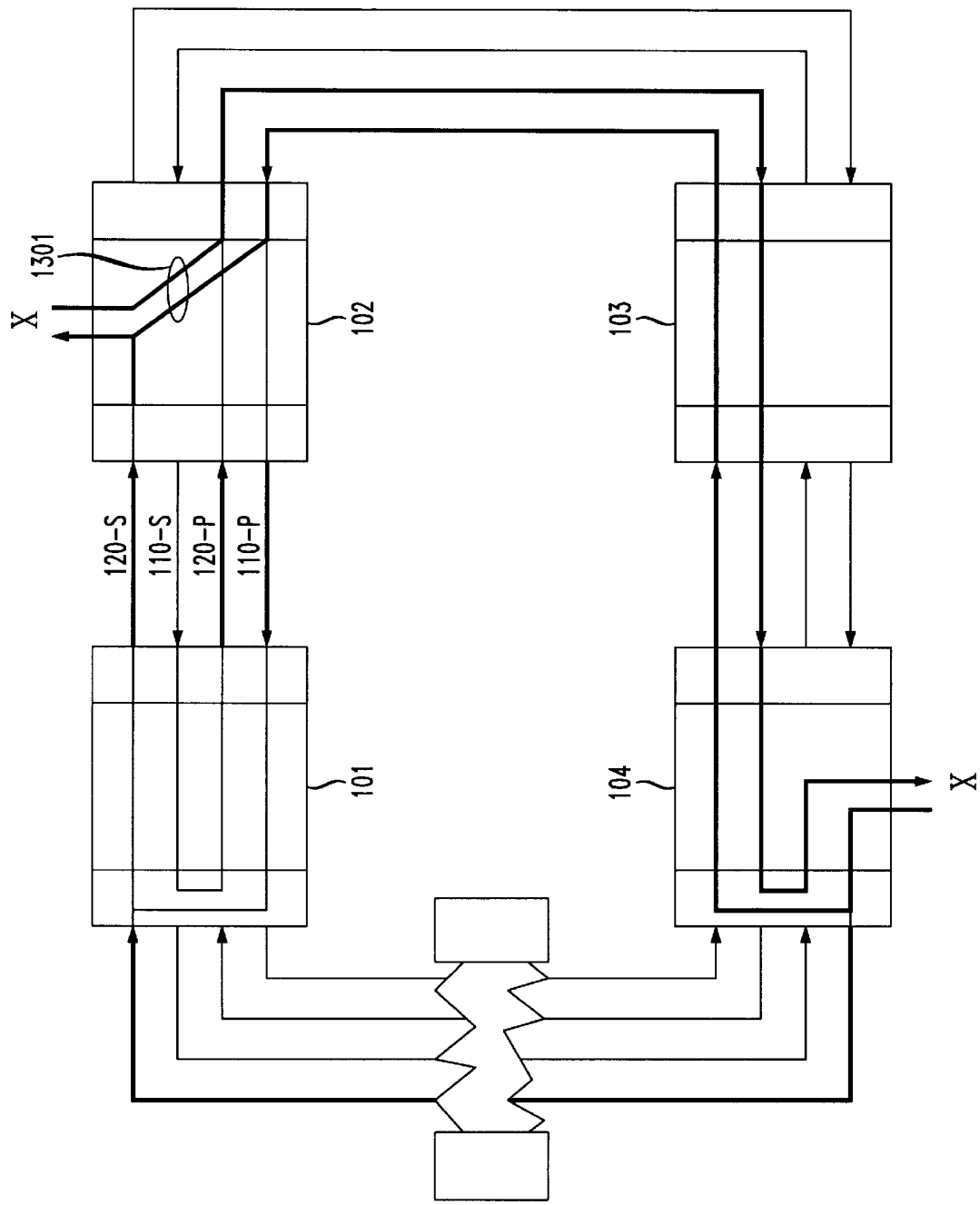
FIG. 13a shows the signal "X" connection after each body node has received the "loopback complete" message without requiring jumpering at border nodes.
Figure 13B:
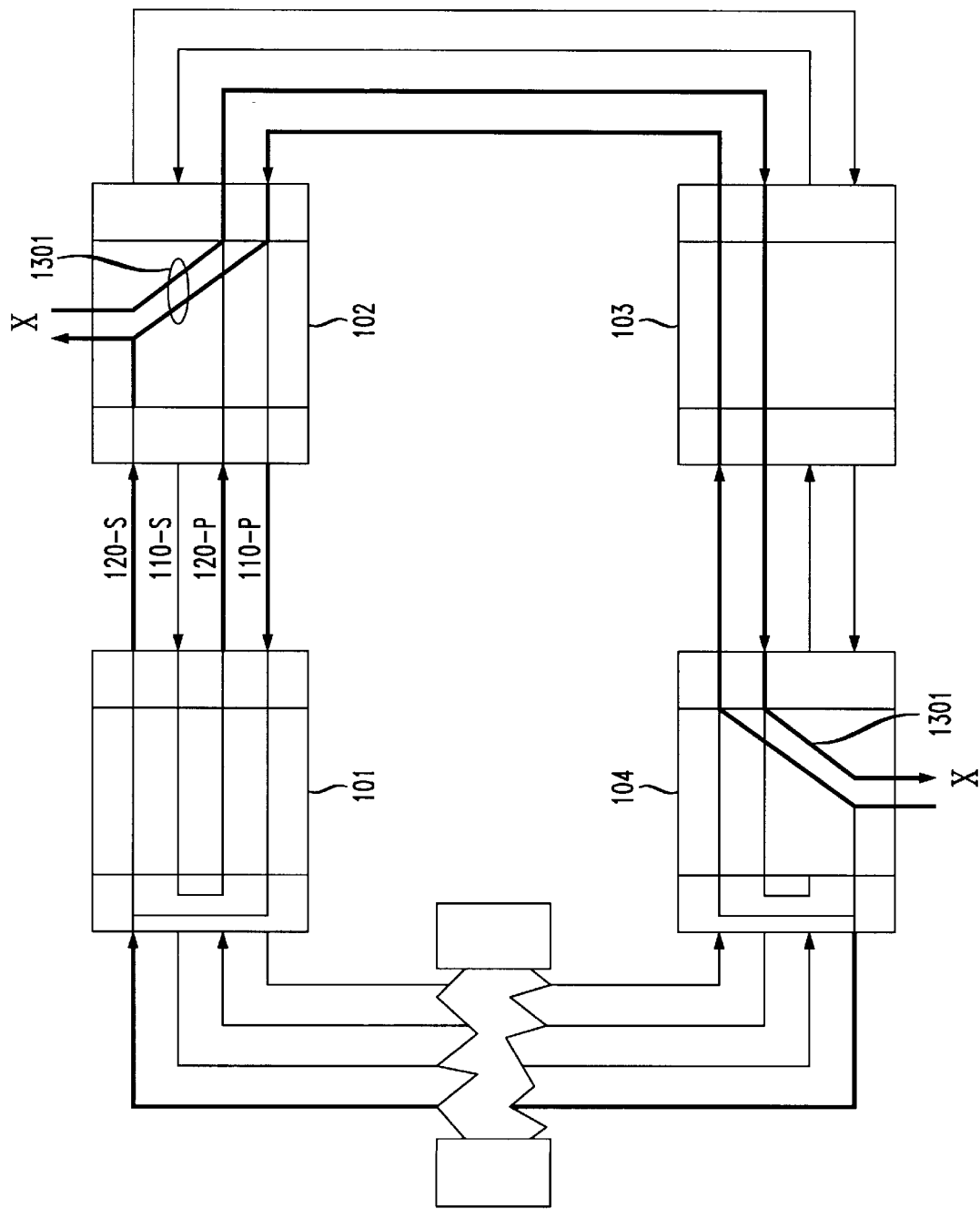
FIG. 13b shows the signal "X" connection after each body node has received the "loopback complete" message requiring jumpering at border nodes.

In FIG. 12a, a complete fiber cut fault has occurred between nodes 101 and 104. As shown, such a cable cut interrupts the transmission of the X signal tributary (the two directions of the signal being indicated by bold lines). Nodes 101 and 104, which border the cable cut, determine that a failure has occurred and propagate a failure message via the K-bytes in both CW and CCW directions. Thus at this time both border nodes 101 and 104 are concurrently sending messages to the next node of the system (i.e., node 101 is sending to node 102 and node 104 to node 103). Note the following description traces the function performed at the different nodes (1) as the messages that originated at node 101 are propagated through nodes 102, 103 and terminate at 104 and (2) as the messages that originated at node 104 are propagated through nodes 103, 102 and terminate at 101. In the following description, all nodes other than the border nodes are referred to herein as body nodes.

When the failure message is received at node 102, the controller, having detected a change in the K-bytes, ceases looping at 1003, checks the message at 1005, and proceeds to step 1007, where it checks the jumper flag. In this example, we are assuming that the ring was unimpaired prior to the fiber cut fault, hence the jumper flag is not set, and therefore, control passes directly to step 1011. Normal BLSR processing is performed, which consists of putting up a protection pass through 1201, which allows onward propagation of the K-bytes to node 103.

At node 103, similar events take place as at node 102, resulting in a protection pass through 1202, and the K-bytes propagating on to node 104. Note that this passthrough may already have been set up due to the receipt of K-bytes from node 104, which is closer. Again, all this is as per normal BLSR processing.

Referring now to FIG. 12b, the receipt of the K-bytes at node 104 causes its controller to pass to step 1005. There are no jumpers, so control passes on to 1011 and normal BLSR operation takes place—in this case, this comprises the setting up of signal loopback 1203.

Meanwhile, the K-byte messages originating at node 104 and propagating through nodes 103 and 101 (in like fashion to the above) result in the setting up of signal loopback 1204 at node 101.

Thus FIG. 12b shows the signal "X" connection 1205 after each border node 104 and 101 has received the "failure" message which originated from the other border node and has performed a loopback connection.

In accordance with normal BLSR processing in step 1011, the controllers of border nodes 101 and 104 then propagated a "loopback complete" confirmation message to the other system nodes. Control at the border nodes then returns, via step 1013, to looping at steps 1001–1003.

At node 102, the "loopback complete" message from node 101 is received before the one from node 104 arrives, step 1014 is performed, and control is transferred to normal BLSR processing in step 1019, which does nothing further than pass on the "loopback complete" K-bytes.

When the "loopback complete" message from node 104 is received at node 102, it performs step 1014 and proceeds on to step 1015, since the other loopback complete message (i.e., the one from node 101) has already been received. In step 1015, a jumper is needed, since the X signal tributary will need to be received from (and transmitted to) the right-hand side in order to eliminate the loop formed to the left. Step 1017 causes node 102 to remove provisioned connection 1205 and passthrough connection 1206 of FIG. 12b, and put in jumpers (1301 of FIGS. 13a and 13b), and set the jumper flag (column 804 of row 821 of FIG. 8). Note that the record of the originally provisioned connection is maintained in the node's memory (column 803 of FIG. 8) for subsequent restoral.

Node 102 then propagates the loopback completion message CCW to node 101, where per normal BLSR operation, steady state is reached. Control at 102 also returns to steady state (looping at 1001–1003) via step 1013.

Note that it is not necessary to put up jumpers at node 104 since it will have the same effect as the loopback at that node (there being no extended loop to truncate), and the present invention does not call for such jumpers to be put up. However, optionally, one may indeed put up such jumpers (FIG. 13b) if that is more desirable.

At this point in time, the system routing connection of the X signal, appears as shown in FIG. 13. As shown in FIG. 13, the resulting restored path is shorter for signal X.

Figure 14:
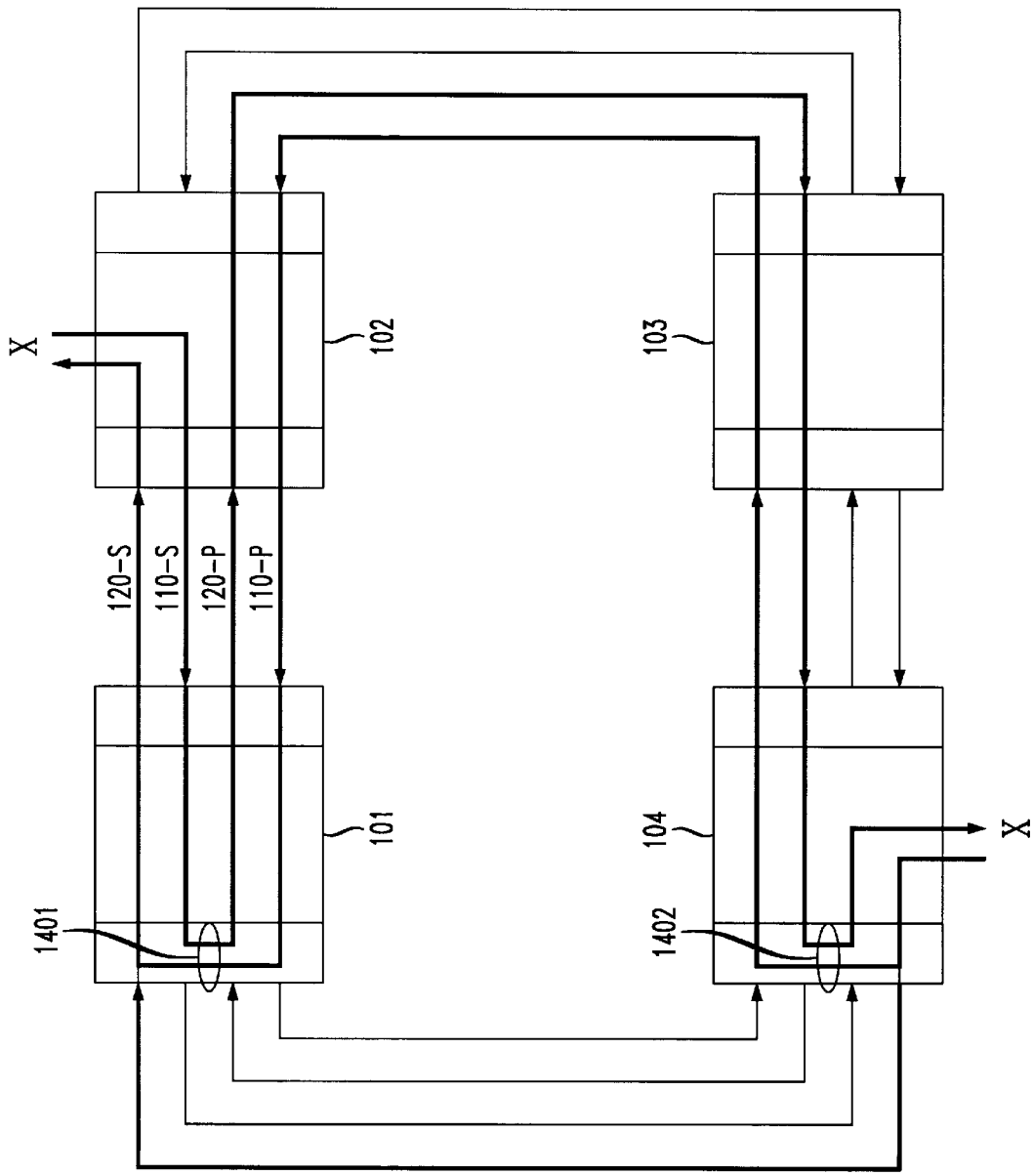
FIG. 14 shows the signal "X" connection after the border nodes have each propagated a "clear" message through the body nodes.

The controller at all of the nodes cycles through steps 1001 and 1003 until another message is received. We assume that the next message is a "clear" message indicating that the system cable cut has been repaired. Referring now to FIG. 14, the clear message is originated at both of the border nodes 101 and 104 and is propagated via node 102 and 103, respectively. When node 102 receives the clear message from 101, control is transferred to step 1007 where the jumper flag is checked; since the flag is set indicating that a jumper exists at node 102 (see column 804 and row 821 of FIG. 8) the controller performs step 1009, and (1) the jumpered connection is taken down, (2) normal (i.e., provisioned) circuit connections restored, and (3) the jumper flag reset. Control then moves to step 1011, whereupon normal BLSR processing is performed, which in this case means that the nodes propagates the clear message to the next node, 103. Control at node 102 then passes to step 1013 and to step 1001.

The clear message is similarly processed in node 103, where it is merely passed through since there are no jumpers set at that node.

With regard to the clear message sent from 104 to 103, since there are no jumpers at 103, no special actions take place there other than normal BLSR processing (the message merely gets propagated), and likewise at 102. At this time the routing of the X signal and other node connections appears as shown in FIG. 14, where the signals are flowing through the conventional BLSR loopback connections and not through the jumpered paths.

When the clear message originated at 101 reaches node 104, since no jumper flag is set, control passes to step 1011 and it executes normal BLSR procedure, whereby the loopback connection 1401 is taken down. Per BLSR procedure, a takedown confirmation message is then sent from node 104. Control then passes to step 1017 and then to step 1001.

Likewise, the clear message sent from 104 results in loopback connection 1402 to be taken down and a takedown confirmation message to be sent from node 101.

Figure 15:
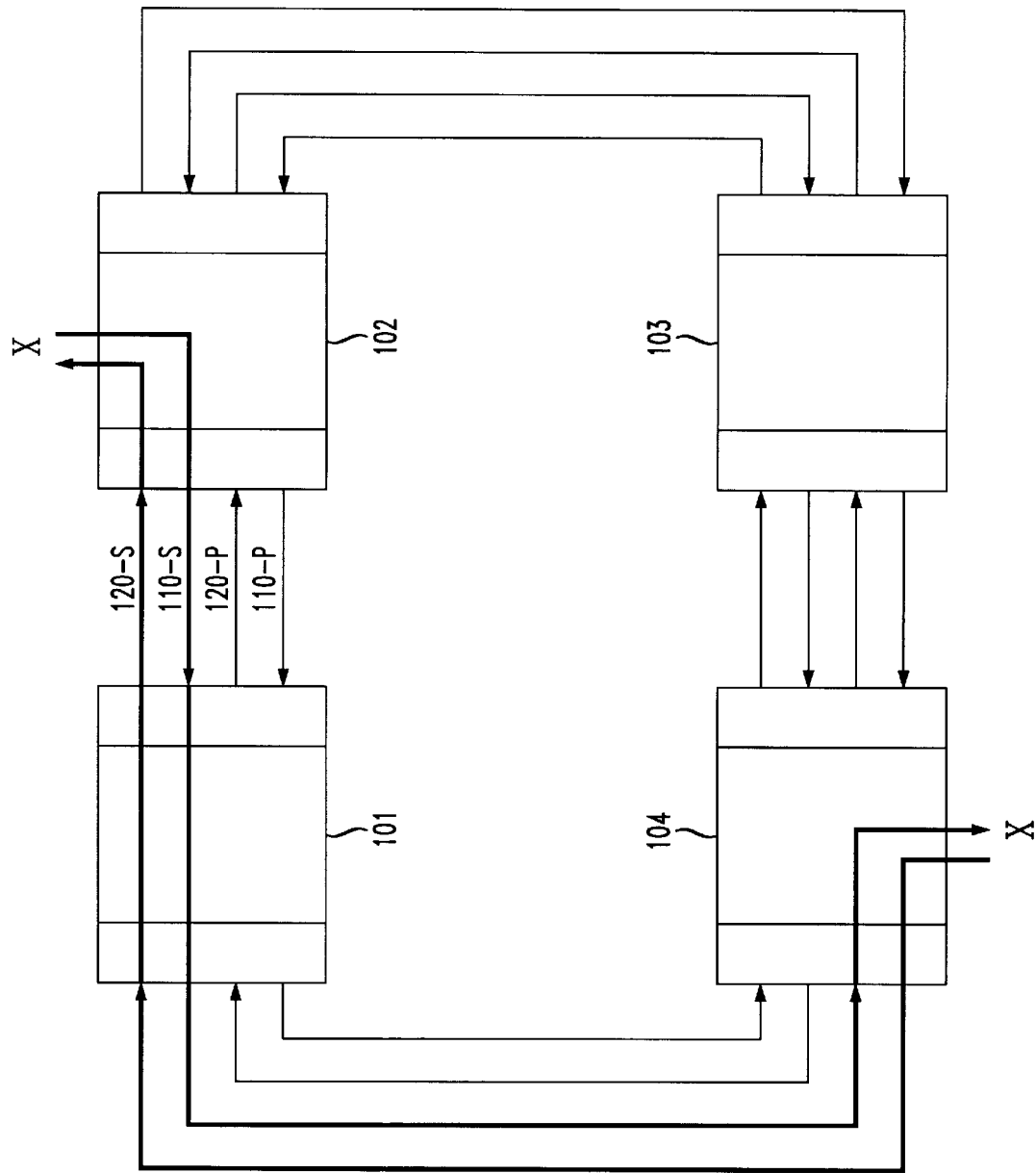
FIG. 15 shows the signal "X" connection after each border node has received the "clear" message which originated from the other border node, has taken down the loopback connection and restored any provisioned switching connection, and propagates a "takedown" message complete through to the other system body nodes.

At this time the routing of the X signal and other node connections appears as shown in FIG. 15, which is the normal provisioned state.

The takedown confirmation messages from node 104 is propagated back through nodes 103 and 102 to 101, and similarly the takedown confirmation messages from node 101 is propagated back through nodes 102 and 103 to 104, with regular BLSR processing being performed at all nodes per step 1021 in FIG. 10, and stable operation is reached.

While we have described the operation of the present invention for a single signal tributary X, it should be noted that our invention can process multiple signal tributaries entering and exiting from different nodes at the same or different times. Thus, our single tributary operational description was merely illustrative of the operation of the present invention. Additionally, the above-described circuits and arrangements are, of course, merely illustrative of the application of the principles of the invention. Other arrangements may be devised by those skilled in the art without departing from the spirit or scope of the invention.

We claim:

1. A bidirectional multiplex section-switched ring transmission system including:
   a plurality of nodes;
   a first transmission path including a service path and a protection path interconnecting said plurality of nodes and transporting communications signals around said system from node to node in a first direction of transmission;
   a second transmission path including a service path and a protection path interconnecting said plurality of nodes and transporting communications signals around said system from node to node in a second direction of transmission opposite the first direction of transmission;
   each of said plurality of nodes comprising:
   memory for storing entries identifying all the nodes and their relative positions in said system, and for storing entries for each of the communication tributaries active at a node which includes entries identifying (1) its provisioned service connection path and (2) a jumper flag indicating if a jumpered connection path exists; and
   programmable controller for accessing and updating entries in said memory and for controlling communication tributaries by performing the steps of
   (a) in response to a loopback setup complete message received at a node from both the first and second directions, determining if a jumpered connection is needed at that node, (b) if a jumpered connection is not needed, performing conventional BLSR processing,
(c) if a jumpered connection is needed,
(1) taking down the provisioned connection,
(2) putting up the jumpered connection,
(3) setting a jumper flag, and
(4) performing conventional BLSR processing.

2. The system of claim 1 wherein said programmable controller further performs the steps of
in response to a loopback takedown message received at a node from both the first and second directions, performing conventional BLSR processing.

3. The system of claim 1 wherein said programmable controller further performs the steps of
in response to a signal fail/degrade message received at a node from both the first and second directions, determining if a jumper flag is set at that node,
if the jumper flag is set (1) taking the jumpered connection down, (2) restoring the provisioned connection, and (3) resetting the jumper flag and
if the jumper flag is not set, performing conventional BLSR processing.

4. The system of claim 1 wherein said programmable controller further performs the steps of
in response to a signal fail/degrade clear message received at a node from both the first and second directions, determining if a jumper flag is set at that node,
if the jumper flag is set (1) taking the jumpered connection down, (2) restoring the provisioned connection, and (3) resetting the jumper flag and
if the jumper flag is not set, performing conventional BLSR processing.

5. The system of claim 1 wherein said messages are determined from the K-bytes.

6. The system of claim 1 wherein said jumpered connection is needed only at nodes at which traffic is being added or dropped from the first or second transmission paths.

7. A method of operating a bidirectional multiplex section-switched ring transmission system including a plurality of nodes and a first and second transmission paths, each transmission path including a service path and a protection path interconnecting said plurality of nodes and transporting communications signals around said system from node to node in a different transmission direction; the method comprising the steps of:
(a) storing entries identifying all the nodes and their relative positions in said system;
(b) storing entries for each of the communication tributaries active at a node which includes entries identifying (1) its provisioned service connection path, (2) its jumpered connection path, and (3) a jumper flag indicating if a jumpered connection path exists;
(c) in response to a loopback setup complete message received at a node from both the first and second directions, determining if a jumpered connection is needed at that node,
(c1) if a jumpered connection is not needed, performing conventional BLSR processing,
(c2) if a jumpered connection is needed, (1) taking down the provisioned connection, (2) putting up the jumpered connection, (3) setting a jumper flag, and (4) performing conventional BLSR processing.

8. The method of claim 7 further including the step of:
in response to a loopback takedown message received at a node from both the first and second directions, performing conventional BLSR processing.

9. The method of claim 7 further including the steps of:
in response to a signal fail/degrade message received at a node from both the first and second directions, determining if a jumper flag is set at that node,
if the jumper flag is set (1) taking the jumpered connection down, (2) restoring the provisioned connection, and (3) resetting the jumper flag and
if the jumper flag is not set, performing conventional BLSR processing.

10. The method of claim 7 further including the step of:
in response to a signal fail/degrade clear message received at a node from both the first and second directions, determining if a jumper flag is set at that node,
if the jumper flag is set (1) taking the jumpered connection down, (2) restoring the provisioned connection, and (3) resetting the jumper flag and
if the jumper flag is not set, performing conventional BLSR processing.

11. A communication node for use in a bidirectional multiplex section-switched ring transmission system including a plurality of nodes and a first and second transmission paths, each transmission path including a service path and a protection path interconnecting said plurality of nodes and transporting communications signals around said system from node to node in a different transmission direction, said node comprising:
memory for storing entries identifying all the nodes and their relative positions in said system, and for storing entries for each of the communication tributaries active at a node which includes entries identifying (1) its provisioned service connection path and (2) a jumper flag indicating if a jumpered connection path exists; and
programmable controller for accessing and updating entries in said memory and for controlling communication tributaries by performing the steps of
(a) in response to a loopback setup complete message received at a node from both the first and second directions, determining if a jumpered connection is needed at this node,
(b) if a jumpered connection is not needed, performing conventional BLSR processing,
(c) if a jumpered connection is needed,
(1) taking down the provisioned connection,
(2) putting up the jumpered connection,
(3) setting a jumper flag, and
(4) performing conventional BLSR processing.

12. The node of claim 11 wherein said programmable controller further performs the steps of
in response to a loopback takedown message received at this node from both the first and second directions, performing conventional BLSR processing.

13. The node of claim 11 wherein said programmable controller further performs the steps of
in response to a signal fail/degrade message received at this node from both the first and second directions, determining if a jumper flag is set at that node,
if the jumper flag is set (1) taking the jumpered connection down, (2) restoring the provisioned connection, and (3) resetting the jumper flag and
if the jumper flag is not set, performing conventional BLSR processing.

14. The node of claim 11 wherein said programmable controller further performs the steps of
in response to a signal fail/degrade clear message received at this node from both the first and second directions, determining if a jumper flag is set at that node, if the jumper flag is set (1) taking the jumpered connection down, (2) restoring the provisioned connection, and (3) resetting the jumper flag and if the jumper flag is not set, performing conventional BLSR processing.

15. A method of operating a node of a bidirectional multiplex section-switched ring transmission system including a plurality of nodes and a first and second transmission paths, each transmission path including a service path and a protection path interconnecting said plurality of nodes and transporting communications signals around said system from node to node in a different transmission direction; the method comprising the steps of:

(a) storing entries identifying all the nodes and their relative positions in said system;

(b) storing entries for each of the communication tributaries active at a node which includes entries identifying (1) its provisioned service connection path, (2) its jumpered connection path, and (3) a jumper flag indicating if a jumpered connection path exists;

(c) in response to a loopback setup complete message received at a node from both the first and second directions, determining if a jumpered connection is needed at this node, (c1) if a jumpered connection is not needed, performing conventional BLSR processing, (c2) if a jumpered connection is needed, (1) taking down the provisioned connection, (2) putting up the jumpered connection, (3) setting a jumper flag, and (4) performing conventional BLSR processing.

16. The method of claim 15 further including the step of:

in response to a loopback takedown message received at this node from both the first and second directions, performing conventional BLSR processing.

17. The method of claim 15 further including the steps of:

in response to a signal fail/degrade message received at this node from both the first and second directions, determining if a jumper flag is set at that node, if the jumper flag is set (1) taking the jumpered connection down, (2) restoring the provisioned connection, and (3) resetting the jumper flag and if the jumper flag is not set, performing conventional BLSR processing.

18. The method of claim 15 further including the step of:

in response to a signal fail/degrade clear message received at this node from both the first and second directions, determining if a jumper flag is set at that node, if the jumper flag is set (1) taking the jumpered connection down, (2) restoring the provisioned connection, and (3) resetting the jumper flag and if the jumper flag is not set, performing conventional BLSR processing.

* * * * *